(12) United States Patent
Yap et al.

(10) Patent No.: US 7,373,088 B2
(45) Date of Patent: *May 13, 2008

(54) AGILE SPREAD WAVEFORM GENERATOR

(75) Inventors: Daniel Yap, Thousand Oaks, CA (US);
Keyvan Sayyah, Santa Monica, CA (US)

(73) Assignee: HRL Laboratories, Malibu, CA (US)

( * ) Notice: Subject to any disclaimer, the term of this patent is extended or adjusted under 35 U.S.C. 154(b) by 1040 days.

This patent is subject to a terminal disclaimer.

(21) Appl. No.: 10/116,829

(22) Filed: Apr. 5, 2002

(65) Prior Publication Data

US 2003/0091097 A1 May 15, 2003

Related U.S. Application Data

(60) Provisional application No. 60/332,372, filed on Nov. 15, 2001, provisional application No. 60/332,367, filed on Nov. 15, 2001, provisional application No. 60/332,371, filed on Nov. 15, 2001, provisional application No. 60/332,368, filed on Nov. 15, 2001.

(51) Int. Cl.
*H04B 10/04* (2006.01)
*H04B 10/12* (2006.01)
*H04B 10/00* (2006.01)

(52) U.S. Cl. ............... 398/183; 398/186; 398/161

(58) Field of Classification Search ............... 398/183, 398/186, 161, 182, 185, 198, 195; 372/26, 372/25, 29.01, 31, 29.04; 359/346
See application file for complete search history.

(56) References Cited

U.S. PATENT DOCUMENTS 4,296,319 A 10/1981 Franks et al. ............... 250/227
5,383,198 A 1/1995 Pelouch et al. .............. 372/18
5,577,057 A 11/1996 Frisken ...................... 372/18
5,710,651 A * 1/1998 Logan, Jr. ................... 398/168
5,723,856 A 3/1998 Yao et al. ............... 250/227.11
5,777,778 A 7/1998 Yao ........................... 359/245

(Continued)

FOREIGN PATENT DOCUMENTS

WO 00/45213 A1 8/2000

(Continued)

OTHER PUBLICATIONS

Ronald T. Logan Jr., "All-Optical Heterodyne RF Signal Generation Using a Mode-locked-laser Frequency Comb: Theory and Experiments", Microwave Symposium Digest, 2000 IEEE MTT-S Internal vol. 3, Jun. 2000, pp. 1741-1744).*
U. Gliese et al., "A wideband heterodyne optical phase-locked loop for generation of 3-18 GHZ microwave carries", IEEE Photonics Technology Letters, vol. 4, Aug. 1992, pp. 936-938).*

(Continued)

*Primary Examiner*—Jason Chan
*Assistant Examiner*—Quan-Zhen Wang
(74) *Attorney, Agent, or Firm*—Ladas & Parry

(57) ABSTRACT

An agile spread spectrum waveform generator comprises a photonic oscillator and an optical heterodyne synthesizer. The photonic oscillator comprises a multi-tone optical comb generator for generating a series of RF comb lines on an optical carrier. The optical heterodyne synthesizer includes first and second phase-locked lasers; the first laser feeding the multi-tone optical comb generator and the second laser comprising a rapidly wavelength-tunable single tone laser whose output light provides a frequency translation reference. A photodetector is provided for heterodyning the frequency translation reference with the optical output of the photonic oscillator to generate an agile spread spectrum waveform.

35 Claims, 8 Drawing Sheets

U.S. PATENT DOCUMENTS

| | | | | |
|---|---|---|---|---|
| 5,917,179 | A | 6/1999 | Yao | 250/227.11 |
| 5,917,970 | A | 6/1999 | Burns et al. | 385/24 |
| 6,201,638 | B1* | 3/2001 | Hall et al. | 359/346 |
| 6,388,787 | B1 | 5/2002 | Bischoff | 359/187 |
| 6,580,532 | B1* | 6/2003 | Yao et al. | 398/39 |
| 6,643,299 | B1* | 11/2003 | Lin | 372/6 |
| 7,085,499 | B2* | 8/2006 | Yap et al. | 398/183 |

FOREIGN PATENT DOCUMENTS

| | | |
|---|---|---|
| WO | 01/80507 | 10/2001 |

OTHER PUBLICATIONS

Yao, X.S., et al., "High Frequency Optical Subcarrier Generator," *Electronics Letters*, vol. 30, No. 18, pp 1525-1526 (Sep. 1, 2994).

Yao, X.S., et al., "Optoelectronic Oscillator for Photonic Systems," *IEEE Journal of Quantum Electronics*, vol. 32, No. 7, pp. 1141-1149 (Jul. 1996).

Bennett, S., et al., "1.8-THz Bandwidth, Zero-Frequency, Error, Tunable Optical Comb Generator for DWDM Applications," *IEEE Photonics Technology Letters*, vol. 11, No. 5, pp 551-553 (May 1999).

Bilodeau, F., et al., "An All-Fiber Dense-Wavelength-Division Multiplexer/Demultiplexer Using Photoimprinted Bragg Gratings," *IEEE Photonics Technology Letters*, vol. 7, No. 4, pp 388-390 (Apr. 1995).

Chu, S., et al., "An Eight-Channel Add-Drop Filter Using Vertically Coupled Microring Resonators over a Cross Grid," *IEEE Journal of Technology Letters*, vol. 11, No. 6, pp. 691-693 (Jun. 1999).

Haus, H., et al., "Narrow-Band Optical Channel-Dropping Filter," *Journal of Lightwave Technology*, vol. 10, No. 1, pp. 57-61 (Jan. 1992).

Kazarinov, R., et al., "Narrow-Band Resonant Optical Reflectors and Resonant Optical Transformers for Laser Stabilization and Wavelength Division Multiplexing," *IEEE Journal of Quantum Electronics*, vol. QE-23, No. 9, pp. 1419-1425 (Sep. 1987).

Little, B. E., et al., "Wavelength Switching and Routing Using Absorption and Resonance," *IEEE Photonics Technology Letters*, vol. 10, No. 6, pp. 816-818 (Jun. 1998).

Yao, X.S., "Multiloop Optoelectronic Oscillator," *IEEE Journal of Quantum Electronics*, vol. 36, No. 1, pp. 79-84 (Jan. 2000).

Yao, X.S., et al., "Optoelectronic Oscillator for Photonic Systems," *IEEE Journal of Quantum Electronics*, vol. 32, No. 7, pp. 1141-1149 (Jul. 1996).

Abstract of JP 07-264136, Patent Abstracts of Japan, vol. 1996, No. 02 (Feb. 1996).

Yamamoto, T., et al., "270-360 Ghz Tunable Beat Signal Light Generator For Photonic Local Oscillator," *Electronics Letters*, vol. 38, No. 15, pp. 795-797 (Jul. 2002).

\* cited by examiner

US 7,373,088 B2

AGILE SPREAD WAVEFORM GENERATOR

CROSS-REFERENCE TO RELATED APPLICATIONS

This application claims the benefit of U.S. provisional application No. 60/332,372 filed Nov. 15, 2001 for an "Agile Spread Waveform Generator" by Daniel Yap and Keyvan Sayyah, the disclosure of which is hereby incorporated herein by reference.

This application is related to a patent application entitled "Agile RF-Lightwave Waveform Synthesis and an Optical Multi-Tone Amplitude Modulator" bearing Ser. No. 60/332,367 and filed Nov. 15, 2001, and its corresponding non-provisional application bearing Ser. No. 10/116,801 and filed on the same date as the present application, the disclosures of which are hereby incorporated herein by this reference. These related applications are owned by the assignee of this present application.

This application is also related to a provisional patent application entitled "Injection-seeding of a Multi-tone Photonic Oscillator" bearing Ser. No. 60/332,371 and filed Nov. 15, 2001, and its corresponding non-provisional application bearing Ser. No. 10/116,799 and filed on the same date as the present application, the disclosures of which are hereby incorporated herein by this reference. These related applications are owned by the assignee of this present application.

This application is also related to a patent application entitled "Remotely Locatable RF Power Amplification System" bearing Ser. No. 60/332,368 and filed Nov. 15, 2001, and its corresponding non-provisional application bearing Ser. No. 10/116,854 and filed on the same date as the present application, the disclosures of which are hereby incorporated herein by this reference. These related applications are owned by the assignee of this present application.

STATEMENT OF GOVERNMENT INTEREST

This invention was made with U.S. Government support from the Defense Advanced Research Projects Agency, under Contract No. F33615-00-C-1674. The U.S. Government has certain rights in this invention.

TECHNICAL FIELD

This invention relates to a RF-lightwave waveform generator capable of generating a set of frequency-spread, frequency-hopped RF waveforms.

BACKGROUND AND INFORMATION REGARDING THE INVENTION

A multi-tone, frequency hopped RF-lightwave waveform functions as a lightwave carrier for an optical transmission channel. The RF signal information carried by the optical transmission channel may be a pulse code, for example, which may be imposed onto the frequency-spread RF-lightwave carrier by means of a lightwave modulator. The final RF-lightwave waveform can be transmitted (by means of an optical fiber link or a free-space optical link) to a photoreceiver. The photoreceived signal, which is in electronic form (frequency converted and demodulated), can then be transmitted through a RF channel (an antenna or wireless link).

As is disclosed herein, the generator of the RF-lightwave carrier includes a frequency-comb generator that is coupled to an optical-heterodyne synthesizer. The comb is a set of RF tones amplitude-modulated onto a lightwave carrier. The generator of the RF-lightwave frequency comb is preferably a photonic oscillator, whose construction is known in the art. The optical heterodyne synthesizer is switchable and produces a pair of phase-locked, CW lightwave lines (at two different optical wavelengths). One of these lightwave lines has the RF comb modulated onto it. Both lines, after being modulated by the comb, are then combined to generate the agile carrier. The center frequency of the photoreceived signal is the heterodyne beat note, which is the difference between the frequencies of the two lightwave lines produced by the optical heterodyne synthesizer. The wavelengths of these lines can be changed rapidly (the wavelengths of these lines can be changed with each transmit pulse, within a single transmit pulse or even within the transmission of a packet of data) to produce different beat-note frequencies. This process hops the center frequency of the resultant multi-tone RF lightwave carrier. Various known methods can be used to realize the optical heterodyne synthesizer.

One purpose of the agile frequency spreading and hopping is to make the resultant signal difficult for a non-coherent receiver to detect. Use of a frequency-spread carrier is one method to produce a signal that has Low Probability of Interception (LPI) by conventional intercept receivers. In addition, if the precise frequency of the carrier can be changed and is unknown to the interceptor, LPI performance is enhanced. These techniques are useful in LPI radar and communication systems.

Typically, an interceptor would use a wideband receiver that is channelized into smaller frequency bands to detect and identify the signal. If the signal falls within a single channel of the receiver, then it can be detected. However, if the signal is spread in frequency so those portions of it fall within many channels, it is difficult for the interceptor to distinguish that signal from the background noise. Typically, the channels of the intercept receiver may be scanned or long integration times may be used to sense an incoming signal. If the signal frequency is varied rapidly to hop between different channels within the sensing time, it again appears like noise. Alternatively, if the signal frequencies are varied rapidly with time although those hops lie within the received channels, that signal will be detected but difficult to identify.

Another purpose of the frequency spreading is to make the signal less susceptible to jamming. The frequency coverage of the jammer may not be as large as the coverage of the frequency-spread carrier. In addition, since the frequency-spread carrier consists of discrete tones that are can be summed coherently, the signal power is used more efficiently. This is in contrast to the jammer, which is uniformly broadband. Rapid switching of the signal band also makes it less susceptible to being jammed, since the jammer cannot predict from one signal pulse to the next which frequency to jam.

Previous methods to achieve LPI performance are based on using electronic synthesizers to produce the waveforms. Typically, a pulse-compression code is used to phase modulate a single-tone carrier and spread the spectrum. For example, if the signal pulse is 1 μsec wide and a 100-to-1 pulse compression code is used, a signal bandwidth of 100 MHz is obtained. The channel bandwidth of the interrogating receiver is typically much narrower than this. The bandwidth of present high-dynamic-range analog-to-digital converters is typically 100 MHz or less. Thus, interrogator channel bandwidths are also 100 MHz or less. This invention preferably makes use of the wideband nature of photonics to generate the frequency-spread waveforms. The total bandwidth of the comb can be quite wide, with several tens of GHz bandwidths easily achieved by the photonic methods of this invention. A pulse-compression code may be modulated onto the multi-tone comb, in addition to the signal information, to further spread the carrier. Prior art digital synthesizers which produce frequency-stepped waveforms typically have a bandwidth of less than 100 MHz. The switchable, optical-heterodyne synthesizer disclosed herein is capable of a frequency range that exceeds 100 GHz.

The agile frequency spread waveform generator disclosed herein also is useful for communication systems with multiple users. Each user is assigned a particular and unique pattern for the frequency hops of the multi-tone waveform. A user can distinguish its signal from other signals that occupy the same band of frequencies by coherently processing the received signal with a copy of the particular waveform pattern of that user. This type of Code Division Multiple Access (CDMA) for lightwave waveforms is different from prior methods. The prior methods make use of short optical pulses, much shorter than the information pulse, whose wavelength and temporal location can be different for each user.

The Prior Art Includes:

1. A single-tone, single-loop optoelectronic oscillator—see U.S. Pat. No. 5,723,856 issued Mar. 3, 1998 and the article by S. Yao and L. Maleki, IEEE J. Quantum Electronics, v.32, n.7, pp.1141-1149, 1996. A photonic oscillator is disclosed (called an optoelectronic oscillator by the authors). This oscillator includes a single laser and a closed loop comprised of a modulator, a length of optical fiber, and photodetector, an RF amplifier and an electronic filter. The closed loop of this oscillator bears some similarity to the present invention. However, the intent of this prior art technique is to generate a single tone by incorporating an electronic narrow-band frequency filter in the loop. A tone that has low phase noise is achieved by using a long length of the aforementioned fiber. Demonstration of multiple tones is reported in this article achieved by enlarging the bandwidth of the filter. However, the frequency spacing of those multiple tones was set by injecting a sinusoidal electrical signal into the modulator. The frequency of the injected signal is equal to the spacing of the tones. This method causes all of the oscillator modes (one tone per mode) to oscillate in phase. As a result, the output of this prior art oscillator is a series of pulses. See FIG. 14(b) of this article.

2. A single-tone, multiple-loop optoelectronic oscillator—see U.S. Pat. No. 5,777,778 issued Jul. 7, 1998 and the article by S. Yao and L. Maleki, IEEE J. Quantum Electronics, v.36, n.1, pp.79-84, 2000. An optoelectronic oscillator is disclosed that uses multiple optical fiber loops, as the time-delay paths. One fiber loop has a long length and serves as a storage medium to increase the Q of the oscillator. The other the fiber loop has a very short length, typically 0.2 to 2 m, and acts to separate the tones enough so that a RF filter can be inserted in the loop to select a single tone. The lengths of the two loops, as well as the pass band of the RF filter, can be changed to tune the frequency of the single tone that is generated. This approach teaches away from the use of multiple optical loops to obtain multiple tones, since it uses the second loop to ensure that only a single tone is produced.

3. 1.8-THz bandwidth, tunable RF-comb generator with optical-wavelength reference—see the article by S. Bennett et al. Photonics Technol. Letters, Vol. 11, No. 5, pp. 551-553, 1999. This article describes multi-tone RF-lightwave comb generation using the concept of successive phase modulation of a laser lightwave carrier in an amplified re-circulating fiber loop. The lightwave carrier is supplied by a single input laser whose optical CW waveform is injected into a closed fiber loop that includes an optical phase modulator driven by an external RF generator. This results in an optical comb that has a frequency spacing determined by the RF frequency applied to the phase modulator and absolute frequencies determined by the wavelength of the input laser. The loop also contains an Er-doped optical fiber amplifier segment that is pumped by a separate pump laser. The effect of the optical amplifier in the re-circulating loop is to enhance the number of comb lines at the output of the comb generator. One may expect some mutual phase locking between the different comb lines since they are defined by the phase modulation imposed by the external RF generator.

4. One technique for generating a RF signal is by optical heterodyning. See FIG. 1. With this technique, the optical outputs of two laser wavelengths produced by a RF-lightwave synthesizer are combined onto a photodetector. In one simple case, the RF-lightwave synthesizer consists of two lasers each producing single wavelengths, i.e., single spectral lines. When their combined output is converted by a photodetector into an electronic signal (the photocurrent), that electronic signal has frequency components at the sum and difference of the two laser lines. Typically, the photodetector also acts as a low-pass frequency filter so that only the heterodyne difference frequency is produced. In order for the heterodyne output to be produced, the two laser lines must be locked together, so that their fluctuations are coherent. Various methods known in the art can be employed to achieve this locking. Optical heterodyning also can be combined with an external optical modulator to perform frequency conversion (frequency translation). This function is illustrated in FIG. 1. The dual-line lightwave output of the RF-lightwave synthesizer is supplied to an optical intensity modulator, with a typical modulator being a Mach-Zehnder interferometer. A RF input signal is also supplied to the modulator, which applies an intensity modulation onto the lightwave signal. The transfer function of the modulator results in the generation of frequency sum and difference terms. The output of the photodetector is another RF signal with frequency components that are the sum and difference between the frequencies of the RF input $\omega_{RF}$ and the frequency spacing between the two laser lines. In essence, the frequency difference $\omega_{LO}$ of the two laser-lines acts as a local-oscillator (LO) frequency that is multiplied with the RF input signal to produce an intermediate frequency (IF) $\omega_{LO} - \omega_{RF}$. A mathematical expression for this process is given as:

$$i_D = \frac{\alpha I_o}{2L_{MOD}} \left\{ 1 + m\sin(\omega_{RF}t) + M\cos(\omega_{LO}t + \phi) \pm \frac{1}{2}mM\sin[(\omega_{LO} \pm \omega_{RF})t + \phi] \right\}$$

where $i_D$ is the photocurrent.

BRIEF DESCRIPTION OF THE INVENTION

In one aspect, the present invention provides an agile spread spectrum waveform generator comprising: a photonic oscillator comprising a multi-tone optical comb generator for generating a series of RF comb lines on an optical carrier; an optical heterodyne synthesizer, the optical heterodyne synthesizer including first and second phase-locked lasers, the first laser feeding the multi-tone optical comb generator and the second laser comprising a rapidly wavelength-tunable single tone laser whose output light provides a frequency translation reference; and a photodetector for heterodyning the frequency translation reference with the optical output of the photonic oscillator to generate an agile spread spectrum waveform.

In another aspect, the present invention provides a method of generating an agile spread spectrum waveform, the method comprising the steps of: generating multi-tone optical comb as a series of RF comb lines on an optical carrier; generating a wavelength-tunable single tone frequency translation reference; and optically combining the optical comb with the frequency translation reference to generate a lightwave waveform suitable for subsequent heterodyning.

DETAILED DESCRIPTION

This invention relates to a unique approach in the generation of rapidly frequency hopped or dithered, multi-tone RF comb lines on a lightwave carrier using coherent optical heterodyning in order to make the signal transmitted on these carriers difficult to detect. In the following description of the invention, the concept of optical heterodyning is discussed first, to provide background information. Two embodiments for generating a frequency translatable comb signal are described with reference to FIGS. 3-6. Then, several embodiments for producing a frequency-hopped waveform are described with reference to FIGS. 7 and 8. Finally, modifications for improved stability are then discussed (with reference to FIGS. 9-11) to one of the two embodiments for generating the frequency translatable comb signal.

Figure 1:
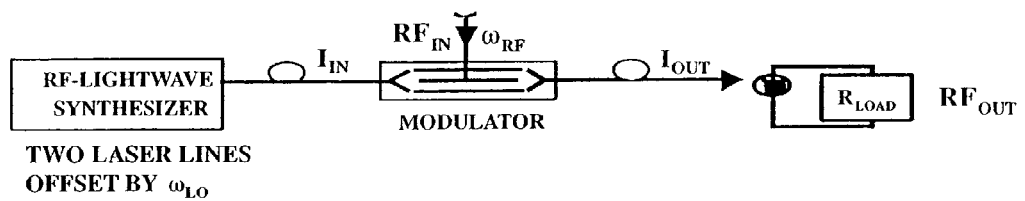
FIG. 1 is an illustration of a prior art frequency conversion technique performed with a RF-lightwave synthesizer.
Figure 2:
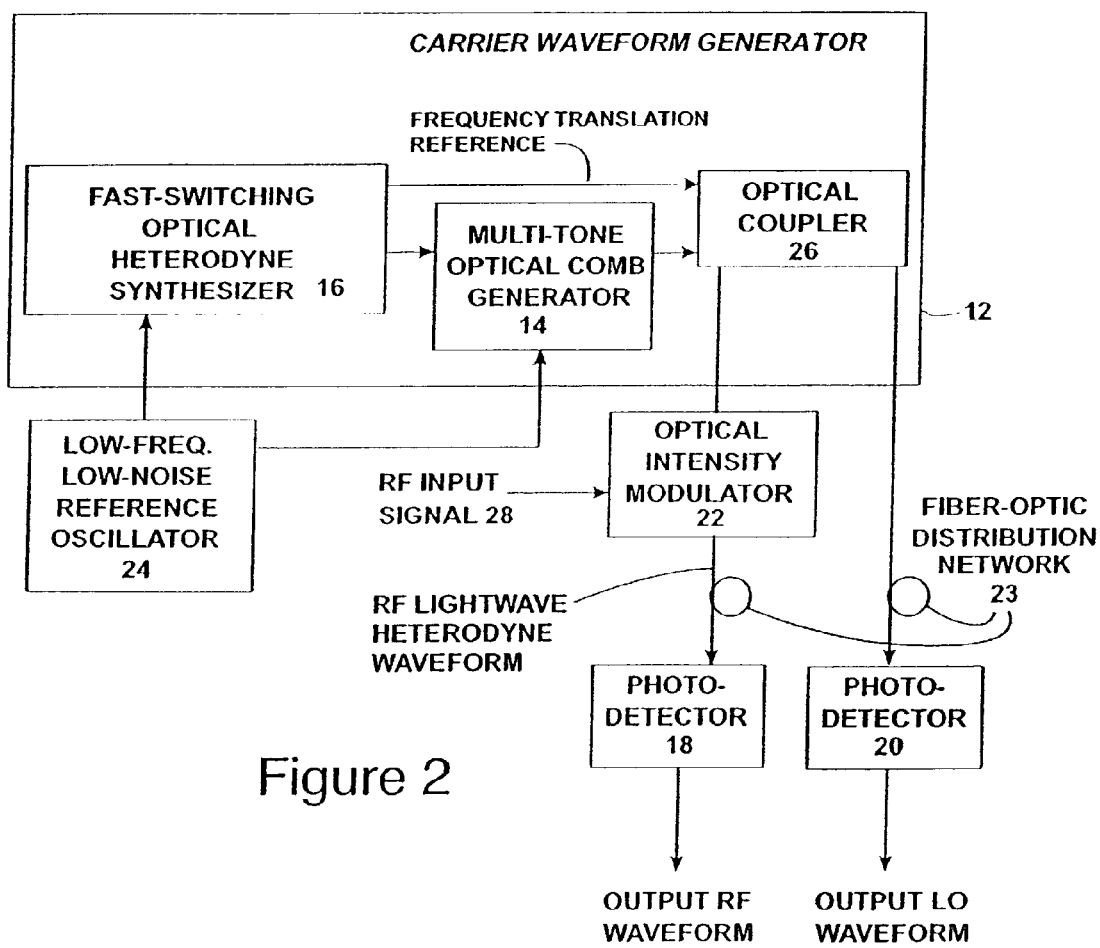
FIG. 2 is a block diagram of an agile waveform generator in accordance with the present invention.

The block diagram of an agile waveform generator 12 is shown in FIG. 2. It has two main portions 14, 16 that will be described in greater detail with reference to FIGS. 3 and 6-10. The first main portion is a type of photonic oscillator, namely, a multi-tone optical comb generator 14 that generates a series of low-phase-noise RF comb lines on an optical carrier. The second main portion is a fast-switching optical heterodyne synthesizer 16, which includes two phase-locked lasers 70, 72 (see FIGS. 7 and 8), the first laser 70 feeding the optical comb generator 14. The second laser 72 is a rapidly wavelength-tunable single tone laser whose output light, a frequency translation reference, is heterodyned with the optical output of the photonic oscillator 14 in a photodetector 18 to generate the frequency hopped RF comb lines (sometimes element 14 herein is referred to as an oscillator and sometimes as a generator—this is due to the fact that "oscillator" 14 "generates" the RF comb). Local oscillator (LO) selector 80 controls the frequency hoping. The agile wavelength offset of the two lasers determines the translation in frequency of the resulting multi-tone RF comb. Furthermore, an optical phase modulator (not shown) can also be inserted in the optical path of the wavelength tunable laser, which can result in further dithering of the multi-tone RF comb in the frequency domain. This effect, combined with the frequency hopping mechanism described above, renders the modulated RF transmit signal very difficult to intercept.

An optical coupler 26 combines the output of the comb generator 14 with the output of the wavelength tunable laser in synthesizer 16. The combined output can be modulated by the RF transmit signal 28 using an optical intensity modulator 22 as shown in FIG. 2. In FIG. 2 the optical intensity modulator 22 is shown downstream of the optical coupler 26. Alternatively, the optical intensity modulator 22 can be placed between generator 14 and coupler 26 as shown by block 22'. Moreover, the output of coupler 26 can be further modulated by additional pulsed or polyphased codes (or the transmit signal can be modulated by such codes) to reduce the probability of detection (intercept) even more. The pulsed or polyphased codes can be applied at the RF signal input 28 or at a separate optical intensity modulator in series with modulator 22).

Figure 9:
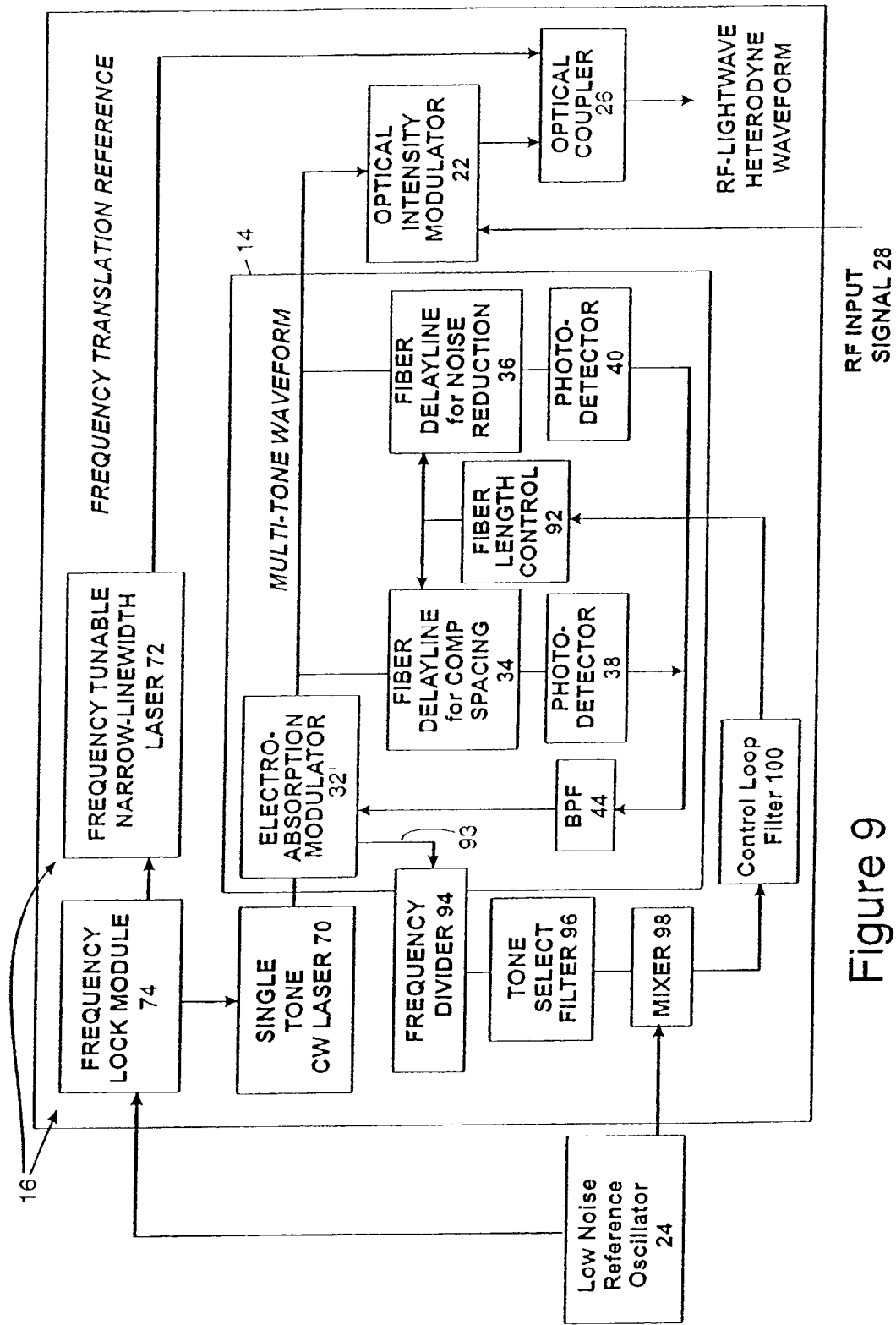
FIG. 9 is a block diagram of the multi-loop, multi-tone photonic oscillator and a block diagram of the fast-switching optical heterodyned synthesizer consisting of a rapidly wavelength tunable and a fixed wavelength laser, the photonic oscillator having a fiber length control apparatus and a feedback loop to control the fiber lengths.

A second output of the optical coupler 26 can be used to generate a local-oscillator reference signal from a photodetector 20, which can be conveniently employed in a coherent receiver. An alternate embodiment is to have the RF input signal 26 and any additional codes modulate the output of the comb generator 14 before the modulated output is combined with the frequency translation reference in coupler 26 by moving the optical intensity modulator(s) discussed immediately above upstream of coupler 26 as depicted in FIG. 9.

The low frequency low noise reference oscillator 24 provides a timing reference signal to the synthesizer 16 and to the multi-tone oscillator 14.

The modulated frequency hopped RF comb lines available at the output of photodetector 18 are applied to a suitable RF amplifier (not shown) and thence to an antenna (also not shown) for transmission as a communication signal or as a radar pulse, as appropriate to the application in which the present invention is utilized.

Photodetector 18 can be implemented as a portion of the RF amplifier and therefore the RF Lightwave Heterodyne Waveform available from, for example, modulator 22, can be supplied as an optical signal to the RF amplifier. One possible embodiment for an RF amplifier is disclosed in U.S. provisional patent application entitled "Remotely Locatable RF Power Amplification System" bearing Ser. No. 60/332,368 and filed Nov. 15, 2001, and its corresponding non-provisional application bearing Ser. No. 10/116,854 and filed on the same date as the present application. The RF Lightwave Heterodyne Waveform could be applied as the sole input to fiber 113 depicted on FIG. 2 of that application and then the function of photodetector 18 would be provided by detectors 302 shown on FIG. 2 of that application. If the output of photodetector 18 is utilized as an input to the RF amplifier, as disclosed in the U.S. patent application entitled "Remotely Locatable RF Power Amplification System" noted above, then the output of photodetector 18 could be applied as an input to modulator 106 shown on FIG. 2 of that application.

Figure 3:
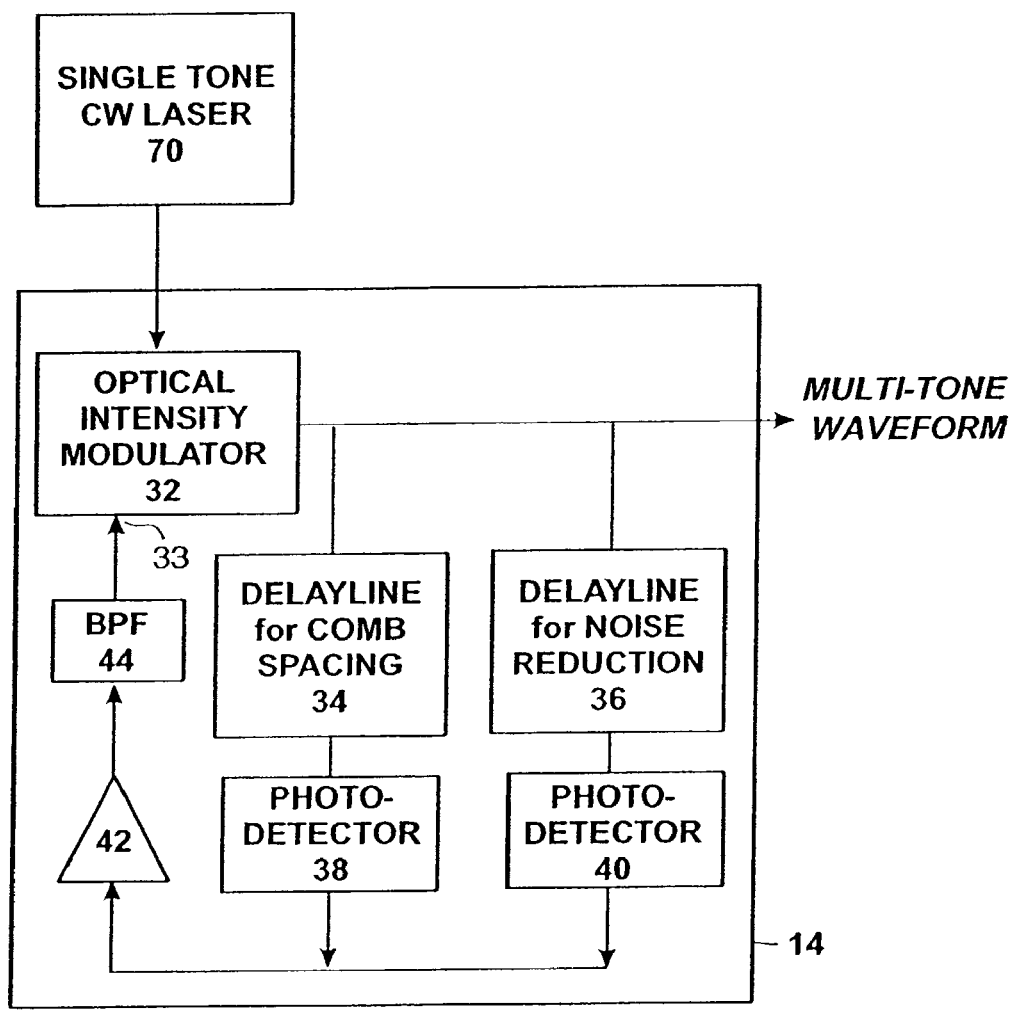
FIG. 3 is a block diagram of the multi-loop, multi-tone photonic oscillator.

The RF-lightwave multi-tone comb generator 14 can be implemented using a variety of techniques. A currently preferred embodiment for this segment of the waveform generator is a multi-loop, multi-tone photonic oscillator 14, a block diagram of which is shown in FIG. 3 (an additional block diagram, including additional features, will be discussed later with reference to FIGS. 6, 9 and 10). The multi-loop, multi-tone photonic oscillator 14 includes at least two loops that preferably have a common portion. An optical modulator 32 is preferably employed in the common portion while lightwave delay paths 34 and 36 and photodetectors 38 and 40 are employed in respective first and second loops. A low-noise electrical amplifier 42 and a RF bandpass filter 44 are preferably also deployed in the loops common portion. The laser light is preferably provided by a laser 70, which supplies the power for the oscillator 14, the laser light being modulated by a RF signal at the electrical input 33 of the modulator 32. The modulated lightwave is then split into two branches, one connected to a shorter optical delay path 34, and the other to a longer optical delay path 36. The optical signals in the two lightwave paths are sensed by two photodetectors 38 and 40 whose electrical outputs are combined and, following amplification and bandpass filtering, are fed back to the modulator 32, as shown in FIG. 3. The bandpass filter 44 sets the bandwidth of the generated RF multi-tone comb spectrum. The two photodetectors 38, 40 can be replaced by a single photodetector (see detector 39 in FIG. 10).

The operating principle of this multi-tone oscillator 14 is as follows. Random electrical noise generated in the feedback loops modulates the laser light, which after propagating through the two optical delay paths 34 and 36 and being photodetected is regeneratively fed back to the modulator 32. This positive feedback results in oscillations if the open loop gain is greater than one. If need be, an amplifier 42 may be provided in the loop common portion to add gain. Gain can alternatively be added in the optical loops by using a pump laser (of the type shown, for example, in FIG. 6—see element 29). In the case of a dual-loop photonic oscillator, potential oscillation modes exist at frequency intervals that are an integer multiple of the inverse of the delay times of the two loops ($\tau_S$ and $\tau_L$), where $\tau_S$ is the delay time of the shorter loop and $\tau_L$ is the longer loop's delay time. However, oscillation will only occur at frequencies where the modes resulting from both delay loops overlap, if the sum of the open loop gains of both feedback loops is greater than one and the open loop gains of each feedback loop is less than one. Therefore, oscillation will only occur at modes spaced at the frequency interval determined by the shorter loop ($\Delta f = k/\tau_S$). On the other hand, the oscillator phase noise $S(f')$ decreases quadratically with the optical delay time in the longer loop: $S(f') = \rho/[(2\pi)^2(\tau_L \rho')^2]$, where $\rho$ is the input noise-to-signal ratio and $f'$ is the offset frequency. Combining these two effects results in a multi-tone, multi-loop photonic oscillator in which the tone spacing and phase noise can be independently controlled.

Figure 4:
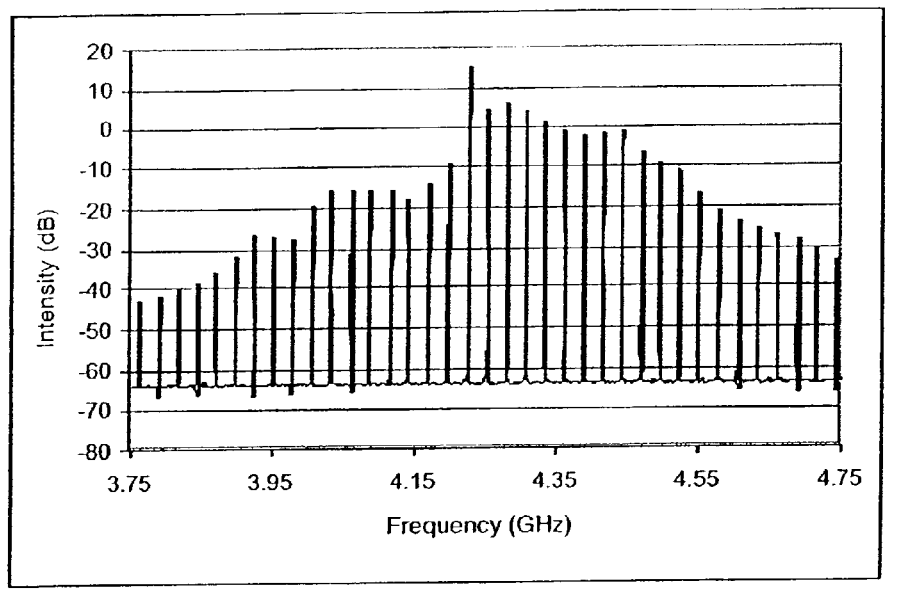
FIG. 4 depicts the measured RF spectrum of a multi-loop, multi-tone photonic oscillator.
Figure 5:
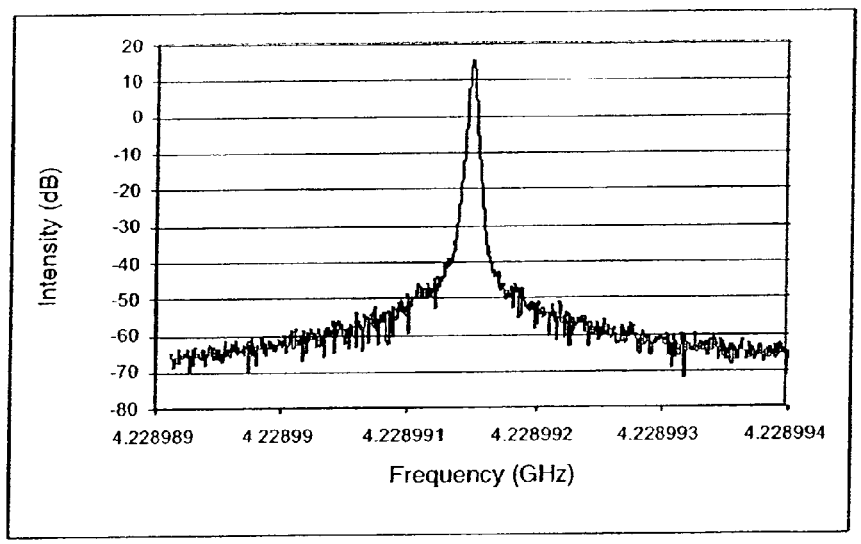
FIG. 5 is a detailed spectrum of one the RF tones of a dual-loop (1 km long loop, 8 m short loop) multi-tone photonic oscillator indicating a very high spectral purity.

The measured RF spectrum of a dual-loop, multi-tone photonic oscillator spanning a frequency range of 1 GHz is shown in FIG. 4. This oscillator has two fiber optic delay loops, with a shorter loop of about 8 m (or longer) and a longer loop of about 1 km (or longer). When the length of the shorter loop is 8 m, the tone spacing is about 26 MHz, indicating a delay time of 38 nanoseconds. The detailed RF spectrum of one of the oscillation tones in the dual-loop multi-tone photonic oscillator is shown in FIG. 5, indicating an excellent spectral purity. The frequency span is 5 KHz. The length of the longer loop is preferably at least 40 or more times longer than the length of the shorter loop.

Figure 6:
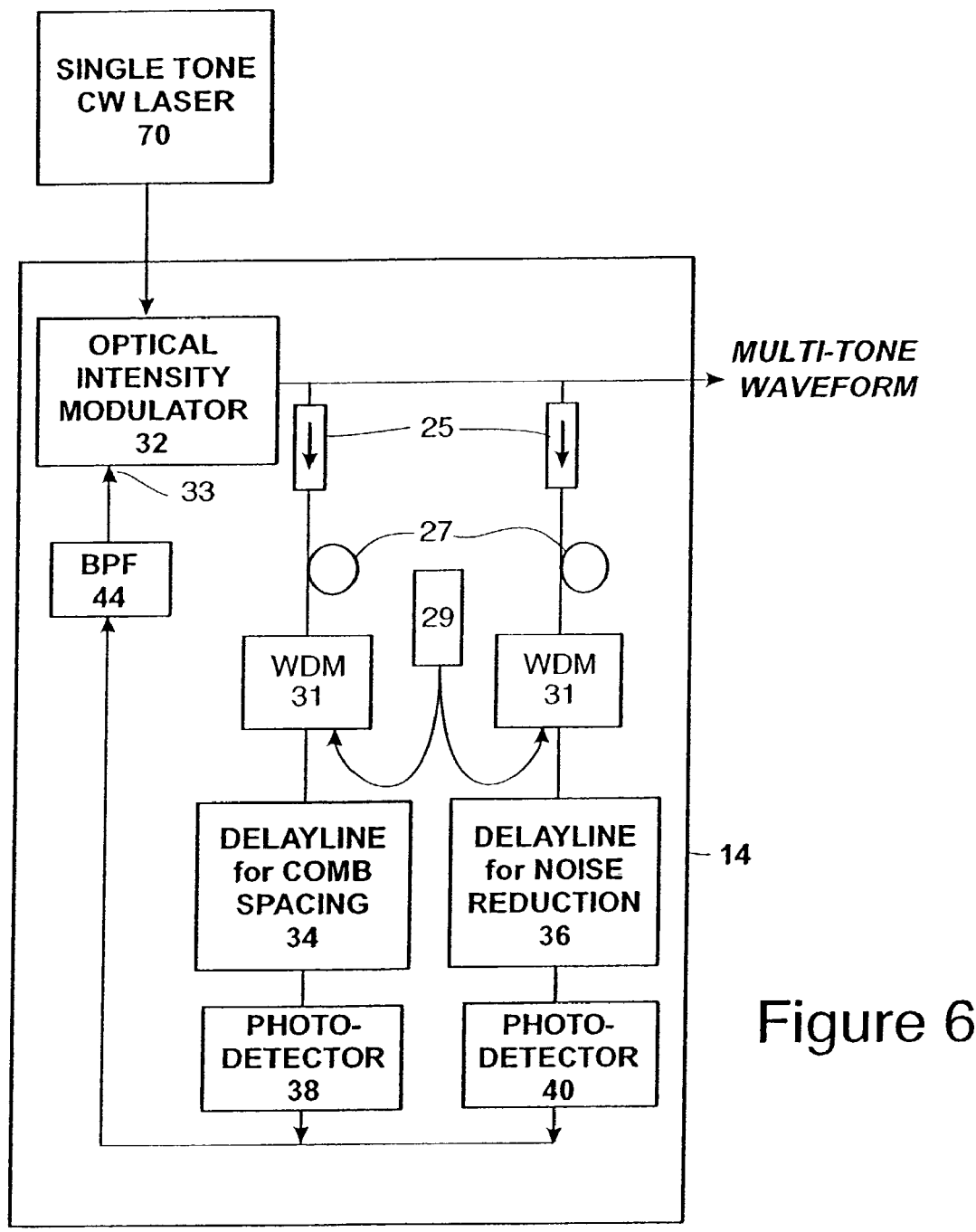
FIG. 6 is a block diagram of the multi-loop, multi-tone photonic oscillator with optically amplified loops.
Figure 10:
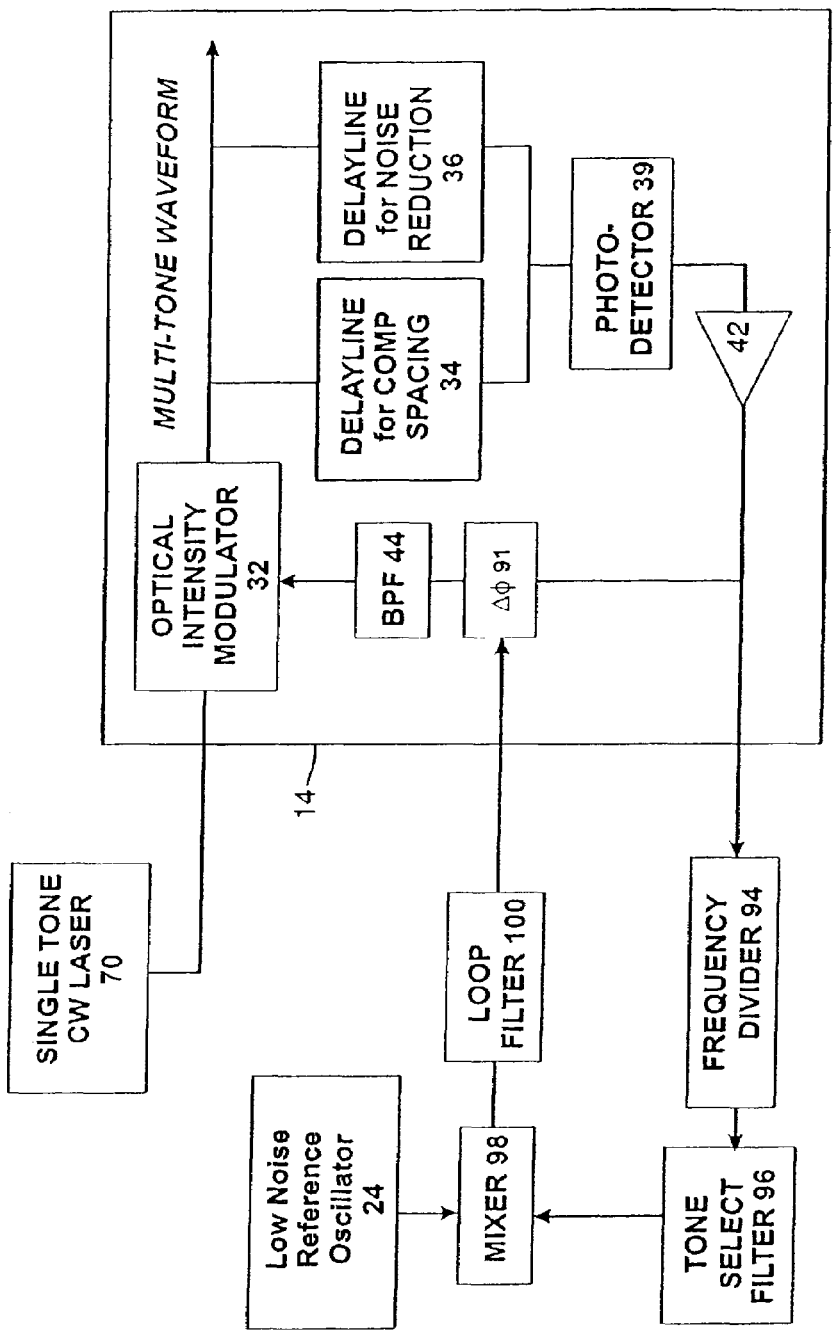
FIG. 10 is similar to FIG. 9, but instead of having a fiber length control apparatus, it utilizes phase control of the loop to compensate for environment changes in the lengths of the fibers in the multi-loop, multi-tone photonic oscillator.

In another embodiment, the multi-tone photonic oscillator 14 can be implemented using optical amplifiers, as shown in FIG. 6, instead of electronic amplifiers, as previously discussed with reference to FIG. 3. In this embodiment, each loop preferably includes an isolator 25, an Er-doped or an Yb/Er-doped fiber segment 27, and a wavelength division multiplexer (WDM) 31. Each doped fiber segment 27 is preferably pumped by a pump laser 29, although the pump laser 29 and the associated Er-doped or Yb/Er-doped segment 27 could be employed in only one of the loops, if desired. The isolators 25 keep the light flowing in the correct direction (clockwise in FIG. 6) in the loops and also keep the light from the pump laser 29 from interfering with the operation of the modulator 32. The WDMs 31 couple the light from the pump laser 29 into the loops and keep that light from interfering with the function of the photodetectors 38, 40. The two photodetectors 38, 40 may be replaced with a single photodetector 39 as shown in FIG. 10 if desired, and two pump lasers 29 could be used (one for each loop), if desired.

Figure 7:
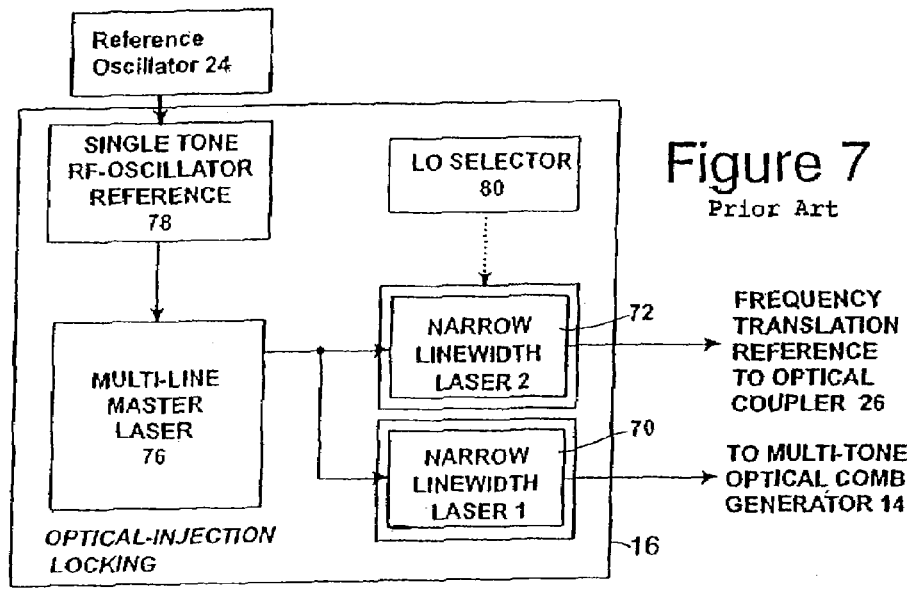
FIG. 7 is an illustration of fast-switching optical heterodyne synthesizer based on optical injection.
Figure 8:
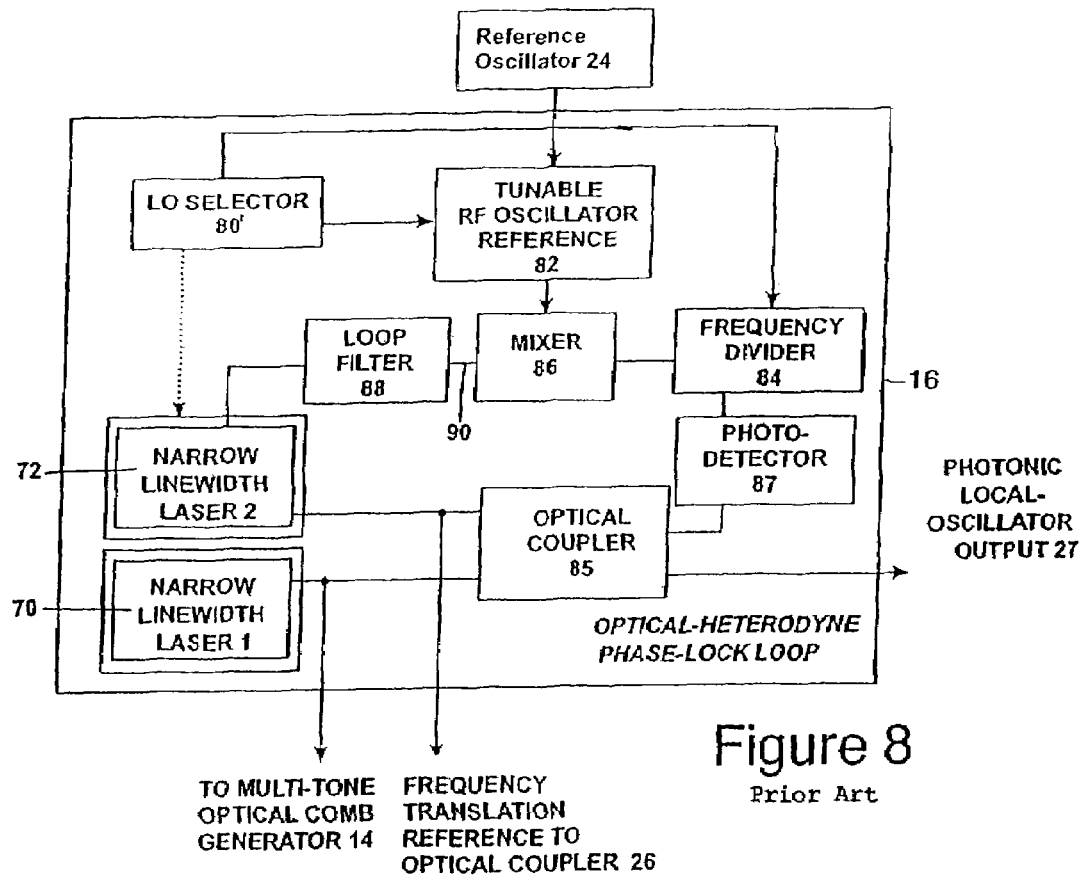
FIG. 8 is an illustration of fast-switching heterodyne synthesizer based on a phase locked loop.

Several techniques can be used to realize the fast-switching optical heterodyne synthesizer 16. See FIGS. 7 and 8 for exemplary embodiments. In the embodiments of FIGS. 7 and 8, the synthesizer 16 includes the two previously mentioned lasers 70 and 72. These lasers are phase-locked. The first laser 70 is a fixed wavelength laser and the second laser 72 is a rapidly tunable laser. This phase locking can be accomplished using several known techniques. One of these techniques, and the preferred technique, is illustrated in FIG. 7. This technique involves optical injection locking of the two lasers 70 and 72 (the slave lasers) to different lines of a multi-line master laser 76. These lines can be: (1) different modes of a mode-locked master laser, (2) modulation sidebands of a frequency modulated master laser, or (3) different phase-locked modes of a multiline laser (see the comb generator disclosed by prior art references 1 and 3).

A highly stable and low phase-noise, single tone RF reference oscillator 78 may be used to externally lock the mode locked laser 76 (if using alternative 1 mentioned above), frequency modulate the master laser 76 (if using alternative 2 mentioned above), or phase modulate the multiline laser 76 (if using alternative 3 mentioned above). The RF reference oscillator 78 may be further stabilized or synchronized by an additional reference oscillator 24 as discussed with reference to FIG. 2.

The optical output of the multi-tone comb generator 14, which is fed by the fixed wavelength laser 70, is an optical comb containing the laser wavelength modulated by the RF comb lines Combining this optical comb with the rapidly tunable wavelength of the second laser 72 in photodetectors 18 or 20 results in a set of RF comb lines which can be rapidly switched (hopped) in the frequency domain. The frequency-hopping interval is determined by the wavelength interval over which the second laser 72 is stepped. With the optical injection locking approaches described above (see the embodiment of FIG. 7), this interval is determined by the spacing between adjacent modes or sidebands of the multi-line master laser 76. If the mode spacing for the multiline master laser 76 is 5 GHz, and the bandwidth of the comb is 5 GHz, the center frequency of the comb can be hopped rapidly between 5 GHz and 10 GHz and 15 GHz, and so on, in any order. Since these two lasers 70 and 72 are phase-locked, as described above, the resulting frequency-switchable heterodyned RF tones will have good spectral purity and low phase noise. Note should be made of the fact that the frequency-hopping interval can be smaller than the bandwidth of the comb.

Another technique for phase locking laser 70 and 72 involves a phased locked loop (see FIG. 8).

The phase-lock loop embodiment of FIG. 8 takes the heterodyned output of the two lasers 70 and 72 and compares that output with an external RF reference 82 in a RF phase detector to produce an error signal 90 at the output of a mixer 86 for correcting the wavelengths of the lasers 70, 72. The outputs of the two lasers 70, 72 are coupled by coupler 85 and detected by photodetector 87 where the heterodyned electrical signal is produced. The output of detector 87 is preferably frequency-divided down by a frequency divider 84 and the output of the frequency divider 84 is applied to the mixer 86. With this approach, the wavelength difference between the two phase-locked lasers 70, 72 can be varied in steps equal to the steps of the frequency divider 84. If continuous tuning is desired then the RF reference 82 should be continuously tunable. A variation of the phase-locked loop approach involves using wavelength intervals that are larger than the frequency of the RF reference. The frequency divider 84 divides the heterodyne output of the two lasers to a lower frequency that can be compared with the RF reference 82 by mixer 86, as illustrated in FIG. 8. The frequency-hopping interval would then be equal to the divider ratio multiplied by the minimum step of the tunable RF reference 82. The embodiment of FIG. 8 permits the hopping to be very fine, so fine that the signal seems essentially continuous. The output 27 of the coupler 85 has hopping information useful to an associated receiver when used in a radar application, for example.

These four alternatives (the three alternative discussed with reference to FIG. 7 and the alternative of FIG. 8) have different advantages and disadvantages. Generally speaking, alternative (1) (which is associated with FIG. 7) generates very clean tones that are easy to switch between. Alternative (2) yields fewer tones. Alternative (3) yields a large number of tones, but they are not clean. Alternative (4) requires lasers that have either a very narrow linewidth or a phase locked loop with a very short loop delay time.

The LO selector 80 shown in FIG. 7 adjusts the free-running frequency or wavelength of laser 72 to match the desired line output from multiline master laser 76. This is accomplished by setting the temperature and drive current of laser 72. The LO selector 80' shown in FIG. 8 sets the temperature of laser 72 to obtain a desired free-running frequency or wavelength for that laser. The actual laser frequency or wavelength is fine tuned by controlling its drive current by means of the phase lock loop. LO selector 80' also selects the frequency of the tunable oscillator 82 as well as the divide ratio of the frequency divider 84.

FIG. 9 is a block diagram of the multi-loop, multi-tone photonic oscillator 14, the photonic oscillator having a fiber length control apparatus 92 and a feedback loop to control the fiber lengths of delay lines 34 and 36. The delay lines 34 and 36 are apt to be sufficiently long that as they change length in response to changes in temperature of their environment, the change in temperature will adversely affect the phase of the oscillator 14. Thus, some means for compensating or controlling the tendency of the fibers 34 and 36 to change length in response to changes of environmental temperature is desirable. In FIG. 9 fiber length control apparatus 92 may be a heating and/or cooling apparatus for heating and/or cooling at least the fibers 34 and 36 in order to control their lengths or fiber length control apparatus 92 may physically stretch the fibers 34 and 36 in order to control their lengths. For example, fiber length control apparatus 92 can comprise piezoelectric fiber stretchers that adjust the fiber lengths. A feedback circuit preferably comprising a frequency divider 94, a tone select filter 96, a mixer 98 and a filter 100 is utilized to control apparatus 92. The frequency divider divides down the output of modulator 32' and tone select filter 96 selects one of the generated and frequency reduced tones for comparison against a reference tone available from, for example, reference oscillator 24 by mixer 98. The output of mixer 98 is filtered to remove unwanted mixing products and then applied as a control signal to fiber length control apparatus 92. In that way, the lengths of the fibers 34 and 36 are adjusted in response to changes in one of the frequencies generated by the photonic oscillator 14.

The optical intensity modulator of the embodiment shown in FIG. 9 is preferably implemented as an electroabsorption modulator 32'. An electroabsorption modulator 32' not only modulates the amplitude of the lightwave carrier supplied by laser 70 but it also produces a photocurrent 93 that is fed to the frequency divider 94 in the feedback circuit. Alternatively, the feedback from the loops may be obtained at the outputs of the photodetectors 38, 40. Also, the two photodetectors 38, 40 may be replaced by a single photodetector 39 as shown in FIG. 10.

FIG. 10 is similar to FIG. 9, but instead of having a fiber length control apparatus 92, it utilizes phase control of the loop to compensate for environmental changes in the lengths of the fibers 34, 36 in the multi-loop, multi-tone photonic oscillator 14. An optical phase shifter 91 is placed in the multi loops of the multi-tone comb generator 14 and is utilized in lieu of the fiber length control apparatus 92 to compensate for changes in the lengths of fibers 34 and 36. The feedback circuit of FIG. 9 is used to control the optical phase shifter 91. This feedback circuit taps off a portion of the photodetected and amplified multi-tone waveform to determine its departure from the frequency and phase of the reference oscillator 24.

Only one photodetector 39 is depicted receiving the light from loops 34 and 36 in FIG. 10. This is only an apparent simplification. One photodetector 39 might seem simpler than two photodetectors 38, 40, but the use of one photodetector 39 will usually require tight phase control between the two loops so that an out-of-phase condition between the two loops does not cause the light to sum incorrectly (or even cancel). Thus, the use of two photodetectors 38 and 40, one associated with each delay line 34 and 36, is preferred for all embodiments, including the embodiment of FIG. 10.

The multi-tone, optical comb generator 14 can alternatively be of a prior art design, such as that disclosed by reference 1 or even possibly reference 3 mentioned above. Such a design is not preferred because of its non-continuous output.

Injection seeding of the photonic oscillator 14 may be needed to initiate oscillations in multiple tones. A suitable injection seeding scheme is disclosed in the US patent application entitled "Injection-seeding of a Multi-tone Photonic Oscillator" referred to above.

Having described the invention in connection with a preferred embodiment therefore, modification will now certainly suggest itself to those skilled in the art. As such, the invention is not to be limited to the disclosed embodiments except as required by the appended claims.

The invention claimed is:

1. An agile spread spectrum waveform generator comprising:
   (a) a photonic oscillator comprising a multi-tone optical comb generator for generating a series of RF comb lines on an optical carrier;
   (b) an optical heterodyne synthesizer, the optical heterodyne synthesizer including first and second phase-locked lasers, the first laser feeding the optical carrier to the multi-tone optical comb generator and the second laser comprising a wavelength-tunable single tone laser whose output light provides a frequency translation reference; and
   (c) a photodetector for heterodyning the frequency translation reference with the series of RF comb lines on the optical carrier generated by the photonic oscillator to generate an agile spread spectrum RF waveform;
   wherein the photonic oscillator further comprises multiple loops including:
   (i) a first optical delay line in a first loop for spacing a comb generated by the multi-tone optical comb generator;
   (ii) a second optical delay in a second loop line for noise reduction, the second delay line being longer than the first optical delay line;
   (iii) at least one photodetector connected to the first and second delay lines; and
   (iv) an optical intensity modulator in a loop portion common to the first and second loops for driving the first and second optical delay lines.

2. The agile spread spectrum waveform generator of claim 1 wherein the loop common portion further includes an amplifier and a band pass filter.

3. The agile spread spectrum waveform generator of claim 2 wherein the amplifier is an electronic amplifier.

4. The agile spread spectrum waveform generator of claim 1 wherein the loop common portion further includes a band pass filter and wherein at least one of the first and second loops includes an optical amplifier therein.

5. The agile spread spectrum waveform generator of claim 1 further including means for compensating for environmental changes affecting a length of at least one of the first and second optical delay lines.

6. The agile spread spectrum waveform generator of claim 5 wherein the means for compensating for environmental changes affecting the length of at least one of the first and second optical delay lines comprises an apparatus for adjusting the length of at least one of the first and second optical delay lines and a feedback circuit including a tone selection filter to the loop common portion and a mixer for mixing the output of the tone selection filter with a reference signal, an output of the mixer being operatively coupled to the length adjusting apparatus.

7. The agile spread spectrum waveform generator of claim 6 wherein the tone selection filter is coupled to the optical intensity modulator.

8. The agile spread spectrum waveform generator of claim 7 wherein the optical intensity modulator is an electro-absorption modulator having an electrical output coupled to the tone selection filter.

9. The agile spread spectrum waveform generator of claim 7 wherein the tone selection filter receives signals from the optical intensity modulator.

10. The agile spread spectrum waveform generator of claim 6 wherein the length adjusting apparatus adjusts the length of both of the first and second optical delay lines.

11. The agile spread spectrum waveform generator of claim 5 wherein the means for compensating for environmental changes affecting the length of at least one of the first and second optical delay lines comprises a phase shifter disposed in the loop common portion and a feedback circuit including a tone selection filter coupled to the loop common portion and a mixer for mixing the output of the tone selection filter with a reference signal, an output of the mixer being operatively coupled to the phase shifter.

12. The agile spread spectrum waveform generator of claim 11 wherein the tone selection filter is coupled to the optical intensity modulator.

13. The agile spread spectrum waveform generator of claim 12 wherein the optical intensity modulator is an electro-absorption modulator having an electrical output coupled to the tone selection filter.

14. The agile spread spectrum waveform generator of claim 11 wherein the tone selection filter receives signals from the optical intensity modulator.

15. The agile spread spectrum waveform generator of claim 1 further including a injection seeding circuit for seeding the photonic oscillator.

16. The agile spread spectrum waveform generator of claim 1 wherein the second optical delay line is more than 40 times longer than is the first optical delay line.

17. The agile spread spectrum waveform generator of claim 1 further including an optical intensity modulator, the optical intensity modulator being responsive to an RF input signal and to the series of RF comb lines on the optical carrier generated by the photonic oscillator for generating a optical signal which is applied to said photodetector.

18. The agile spread spectrum waveform generator of claim 1 further including an optical coupler responsive to an RF input signal, the optical coupler being connected to receive the series of RF comb lines on the optical carrier generated by the photonic oscillator and the frequency translation reference generated by the second laser, the optical coupler being connected either upstream or downstream of the optical intensity modulator which is responsive to the RF input signal.

19. The agile spread spectrum waveform generator of claim 18 wherein the RF input signal includes a pulsed code or polyphased codes.

20. A method of generating an agile spread spectrum waveform, the method comprising:
   (a) generating multi-tone optical comb as a series of RF comb lines on an optical carrier using a photonic oscillator;
   (b) generating a wavelength-tunable single tone frequency translation reference; and
   (c) optically combining the optical comb with the frequency translation reference to generate a lightwave waveform suitable for subsequent heterodyning;
   wherein generating multi-tone optical comb comprises:
   (i) optically delaying the comb in a first loop for spacing comb lines in the comb;

(ii) optically delaying the comb in a second loop line for noise reduction, a second optical delay caused by step (ii) being longer than a first optical delay caused by step (i);
(iii) photodetecting the delayed comb; and
(iv) using the delayed comb in an optical intensity modulator to modulate an output of a laser to thereby generate said multi-tone optical comb as a series of RF comb lines on an optical carrier.

21. The method of claim 20 further including the step of heterodyning the lightwave waveform.

22. The method of claim 21 further wherein the step of heterodyning is performed by at least one photodetector.

23. The method of claim 20 wherein a loop common portion further includes an amplifier for amplifying the comb and a band pass filter for establishing a bandwidth of the comb.

24. The method of claim 23 wherein the amplifying is performed electronically.

25. The method of claim 20 wherein a loop common portion includes a band pass filter for establishing a band width of the comb and further including a step of optically amplifying the comb in at least one of the first and second loops.

26. The method of claim 20 further including the step of compensating for environmental changes by changing the amount of at least one of the first and second optical delays.

27. The method of claim 26 wherein the step of compensating for environmental changes by changing an amount of at least one of the optical delays is performed by comparing frequency or phase of one comb line in the comb with a reference and adjusting a length of at least one optical delay line carrying the comb.

28. The method of claim 27 wherein the adjusting step adjusts the length of first and second optical delay lines.

29. The method of claim 26 wherein the step of compensating for environmental changes by changing an amount of at least one of the optical delays is performed by comparing frequency or phase of one comb line in the comb with a reference and adjusting a phase of the comb.

30. The method of claim 20 further including the step of seeding the photonic oscillator to initiate the comb.

31. The method of claim 20 wherein the second optical delay is more than 40 times longer than is the first optical delay.

32. The method of claim 20 further including the step of intensity modulating the comb with an optical intensity modulator responsive to an RF input signal and to the series of RF comb lines on the optical carrier for modulating said lightwave waveform.

33. The method of claim 32 wherein the RF input signal applies a pulsed code or polyphased codes to the optical intensity modulator.

34. The method of claim 20 further including the step of modulating the intensity of the comb and the frequency translation reference with an optical intensity modulator responsive to an RF input signal and to the series of RF comb lines on the optical carrier and to the frequency translation reference for modulating said lightwave waveform.

35. The method of claim 34 wherein the RF input signal applies a pulsed code or polyphased codes to the optical intensity modulator.

* * * * *